May 20, 1947.   H. B. BREEDLOVE   2,420,649
HYDRAULIC TORQUE AMPLIFIER
Filed June 14, 1944
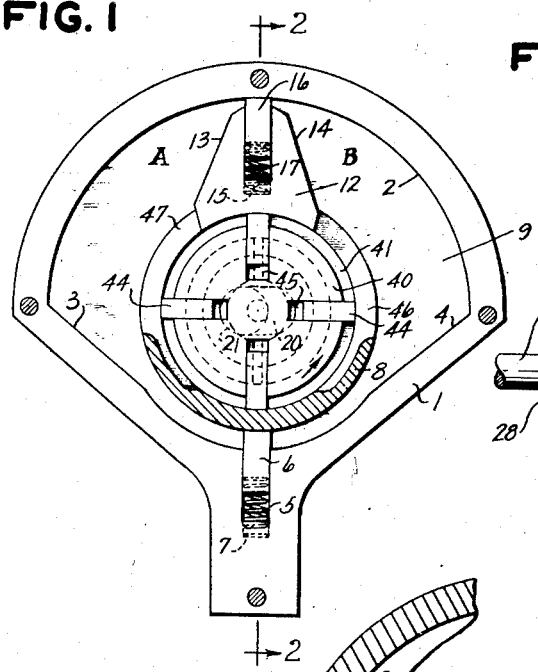
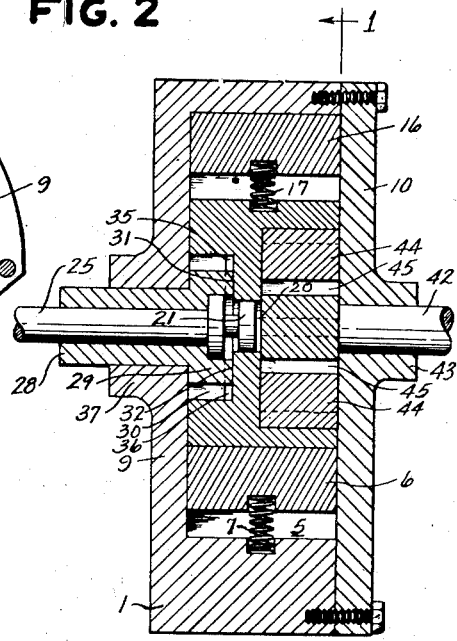
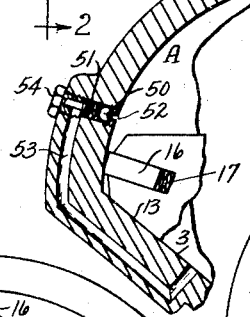
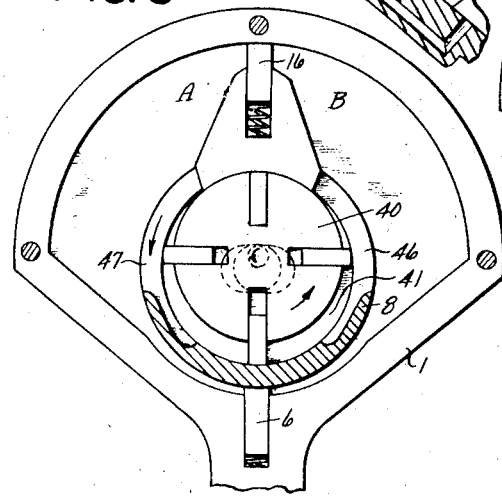
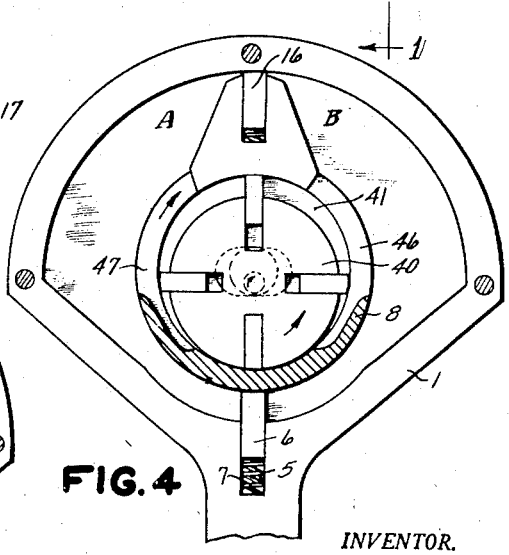
INVENTOR.
HARRY B. BREEDLOVE
BY Joseph U. Hazell
Clade Koontz
ATTORNEYS Patented May 20, 1947

2,420,649

UNITED STATES PATENT OFFICE 2,420,649

HYDRAULIC TORQUE AMPLIFIER

Harry B. Breedlove, Springfield, Ohio

Application June 14, 1944, Serial No. 540,288

10 Claims. (Cl. 60—52)

(Granted under the act of March 3, 1883, as amended April 30, 1928; 370 O. G. 757)

The invention described herein may be manufactured and used by or for the Government for governmental purposes without the payment to me of any royalty thereon.

This invention relates to torque amplifiers, and particularly to that class of amplifiers wherein torque force is derived from a rotary hydraulic pump of the variable capacity type in conjunction with a fixed capacity motor.

It is an object of the invention to provide a torque amplifier having utility as a servomotor wherein an external source of mechanical power provides a substantially non-varying power input to an hydraulic pump, and an externally operable control means whereby a variable torque power output is obtained, limited only by the power input and substantially independent of the power required to operate the control means, for steering vehicles, operating boat rudders or airplane controls and the like.

In accordance with the invention, an hydraulic pump rotor is adapted for rotation in a normally concentric pump chamber recessed within a pump casing, the casing being radially movable with respect to the axis of rotation of the rotor by manually controllable means whereby an eccentric relationship of the pump chamber to the rotor is established operative to control pumping action of the rotor. A novel structure is provided whereby the fluid thus pumped is effective to cause pivotal displacement of the casing for the realization of torque force externally of the device in a determinable direction and at a controllable rate.

Various features of the invention will be apparent from the detailed description hereinafter following and from the appended drawings in which:

Fig. 1 is a view of the interior of a torque amplifier embodying the invention with the cover removed showing the several elements of the invention in place, the view being taken on line 1—1 of Fig. 2;

Fig. 2 is a cross section taken on the plane 2—2 of Fig. 1;

Fig. 3 is an interior view with the cover removed showing the position of certain of the elements of the invention for producing a torque force in one direction;

Fig. 4 is an interior view with the cover removed showing the position of the same elements for producing a torque force in the opposite direction; and Fig. 5 is a fragmentary view showing a spring biased relief valve incorporated in the device.

Referring now to Figs. 1 and 2, 1 is a generally cup-shaped, oil-filled housing formed with a semi-cylindrical interior surface 2 terminating in sloping shoulders 3 and 4 having radially aligned with the axis of surface 2 a slot 5 wherein a slidably disposed partition 6 is biased by a spring 7 into sealing, but slidable engagement with the exterior surface of a pump casing 8.

The inner end of slot 5 is a continuation of the interior surface of a wall 9 of housing 1, the outer end of the slot being open, and partition 6 is adapted for a sealing, but slidable, fit between the inner end of the slot and the inner surface of a cover plate 10 bolted to body 1.

The pump casing 8 is generally cylindrical except for a longitudinally extending wall 12 having sloping sides 13 and 14 and an open ended slot 15 radially aligned with the axis of the semi-cylindrical surface 2. A partition 16 is slidably disposed within slot 15 and spring biased into sealing, but slidable, engagement with surface 2 by a spring 17.

Pump casing 8 and partition 16 are adapted for a sealing, but slidable, fit between the inner surface of wall 9 and the inner surface of cover plate 10.

A barrier comprising casing 8 and partitions 6 and 16 in conjunction with the interior surface of wall 9 and cover plate 10 divides housing 1 into two chambers, A and B.

Casing 8 has a cam slot 20 wherein a cam 21 is disposed, the coaction therebetween being known as a "Scotch yoke" and familiar to those skilled in the art. Cam 21 is at the extremity of a manually rotatable shaft 25 supported concentrically within a torque output shaft 28 having a flange 29 engaging wall 9 and extending into an annular recess 30 in casing 8 and having radial guide lugs 31 and 32 on the face thereof extending into slidable engagement with the guide grooves 35 and 36, respectively, formed radially in the bottom of recess 30. Torque output shaft 28 is rotatably supported in a bearing 37 formed on housing 1 and is adapted at its outer end for coupling to a torque operated device (not shown). A pump rotor 40 is disposed within an annular pump chamber 41 of casing 8 and is supported for rotation therein by a power driven shaft 42 extending through cover plate 10, rotatably supported in a bearing 43 formed therewith. Vanes 44 are slidably disposed in open ended slots 45 of rotor 40 and longitudinally retained therein between the inner circular surface of chamber 41 and inner face of cover plate 10. The effect of centrifugal force when rotor 40 is rotated maintains sliding engagement of the vanes 44 with the internal annular surface of pump 41. Ports 46 and 47 are provided through the annular wall of pump chamber 41 in casing 8 on opposite sides of the partition 16 whereby communication between pump chamber 41 and the housing chambers A and B is effected. Ports 46 and 47 are somewhat narrower longitudinally than the longitudinal width of vanes 44 whereby the vanes are radially retained when passing the ports during rotation of the rotor 40.

Casing 8 is seen to be pivotally related to housing 1 and rotor 40, and guided for reciprocal radial movement by lugs 31 and 32 sliding in grooves 35 and 36 respectively, whereby rotation by an operator of shaft 25 will cause the cam 21 to ride within cam slot 20 and displace the pump chamber 41 eccentrically relative to pump rotor 40. As will be seen by comparison of Figs. 3 and 4, casing 8 is displaceable in one direction or the other along a line determined by lugs 31 and 32, depending upon the direction of rotation of the shaft 25.

In operation, assuming pump chamber 41 is concentric with rotor 40, as shown in Fig. 1, with rotation of rotor 40 as indicated, the amount of fluid pumped through ports 46 and 47 into either chamber A or B will equal the amount removed therefrom and, accordingly, no directional pumping effect tending to increase the fluid in either chamber at the expense of the fluid in the other chamber will be realized. Assuming, however, that shaft 25 is manually rotated counterclockwise as indicated in Fig. 3, casing 8 will be reciprocated by cam 31 downwardly relative to rotor 40 whereby chamber 41 becomes eccentrically related thereto. Fluid will be pumped from chamber A to chamber B expanding the latter as casing 8 and partition 16 are pivoted about the axis of torque output shaft 28 (Fig. 2) in a counterclockwise direction operative to provide a counterclockwise torque to shaft 28 due to the keying action of lugs 31 and 32 in grooves 35 and 36, respectively. Shaft 28 will continue to follow shaft 25 with some lag until rotation of shaft 25 is stopped, at which time, shaft 28 continues to rotate to the extent of the degree of lag, the cam 20 and cam slot 21 then being aligned and concentricity between chamber 41 and rotor 40 being restored and pumping action ceasing. It will be appreciated that the pivotal action of casing 8 and partition 16 continues as long as pump chamber 41 is eccentrically disposed with respect to the axis of rotor 40, i. e., until shaft 28 has rotated the same number of degrees as shaft 25, or until the limit of travel of the pivotal members has been reached, i. e., when shoulder 13 or 14 on casing 8 has come into abutment with shoulder 3 or 4, respectively, of housing 1.

Reversibility is obtained as indicated in Fig. 4 wherein shaft 25 has been rotated clockwise, reciprocating casing 8 upward with respect to rotor 40, whereby the eccentric relationship of pump chamber 41 thereto is operative to cause the pumping of fluid from chamber B to chamber A, expanding the latter as casing 8 and partition 16 are pivoted about the axis of shaft 28 in a clockwise direction, whereby shaft 28 is capable of exerting a clockwise torque force.

The embodiment shown in the drawings has a total angular travel of approximately 170°, but it will be understood that a lesser or greater degree of travel is a matter of design.

The torque power output is governable by the degree of lag between shaft 25 and shaft 28, the degree of eccentricity between chamber 41 and rotor 40 being proportional thereto and the greater the eccentricity, the greater the pumping rate of fluid from one chamber to the other.

In Fig. 5 is shown a means for relieving fluid pressure which would ordinarily stall the pump rotor in the event of shoulder 13 being brought into abutment with shoulder 3 prior to restoration of concentricity between pump chamber 41 and pump rotor 40. The pressure relief means comprises a conventionally arranged ball check valve 50 biased to closed position by a spring 51 against a valve seat ring 52. A passageway 53 disposed in the housing shell provides communication through the hollow interior of a cap screw 54 between the pressure side of partition 16 and the exhaust side thereof, corresponding to chambers B and A, respectively. In operation, as partition 16 sweeps past valve seat ring 52, ball valve 50 is exposed to pump pressure and provides a bypass for fluid flow around partition 16 at a pressure predetermined by the initial compression in spring 51. A similar arrangement (not shown) of relief valve may be provided on the other side of the housing to prevent stalling of the pump in the event of shoulder 14 abutting shoulder 4. In this manner, stalling of the pump and consequent torque shock on input shaft 42 is avoided in the event that casing 8 is operated to the extreme limit of travel in either direction before concentricity between pump chamber 41 and pump rotor 40 is fully restored.

The invention is capable of extended application and is not confined to the exact showing of the drawings nor to the precise construction described and, therefore, such changes or modifications may be made therein as do not effect the spirit of the invention nor exceed the scope thereof as expressed in the appended claims.

What I claim is:

1. In a torque amplifier, an oil filled housing, a pump casing supported for pivotal movement therein, a pump rotor supported for rotation within said pump casing, partition means disposed for pivotal movement with said pump casing, said pump casing, said rotor and said partition means comprising a barrier dividing the housing into two chambers and ports in said casing communicating therewith, said pump casing being supported for radially eccentric movement with respect to said pump rotor whereby eccentric movement relative thereto is operative to control pumping of oil through said ports from one chamber to the other, the pump casing and partition means being pivotally displaced responsive to interchange of oil between said chambers, whereby a torque force is derived from the pivotal displacement thereof.

2. In a torque amplifier as set forth in claim 1, wherein said partition means is supported on the exterior of said casing and disposed for sealing coaction with the internal surface of said housing.

3. In a torque amplifier as set forth in claim 1, said housing having an internal surface spaced from said pump casing, said partition means comprising a partition supported on said pump casing intermediate the ports communicating with said chambers and forming a common wall therebetween and adapted to slidably and sealingly engage the internal surface of the housing during pivotal movement of said pump casing and additional partition means within said housing rotatively stationary relative thereto and disposed as a common wall between said chambers intermediate the parts communicating with said chambers.

4. In a torque amplifier, a liquid filled housing, a rotary pump therein comprising a rotor and a surrounding casing having two parts for alternative inlet and outlet coaction with said rotor, barrier means comprising said casing dividing said housing into two chambers, each of said chambers communicating with one of said ports, means for positioning said casing into concentric or eccentric relationship with said rotor for controlling the quantity and direction of fluid interchange between said chambers, said fluid interchange being operative to displace said barrier means causing expansion of one chamber and contraction of the other whereby torque force is derived from the displacement of said barrier means.

5. In a torque amplifier as set forth in claim 4, wherein said housing has an internal substantially smooth surface extending into each of said chambers and said casing is supported for pivotal movement relative thereto, and additional barrier means comprising a partition supported on said casing for pivotal movement therewith and forming a common wall between said chambers and adapted to slidably and sealingly engage said internal surface of said housing during pivotal movement thereof.

6. In a torque amplifier, a fluid filled housing, a rotary pump therein comprising a casing, a pump chamber having a cylindrical internal surface, and a pump rotor in said pump chamber spaced from said internal surface, means for manually positioning said pump chamber eccentrically of said pump rotor for controlling pumping action thereof, said casing having a generally cylindrical exterior, a semicylindrical internal surface in the housing extending about and spaced from said casing exterior, said casing being keyed to a torque output shaft protruding externally of the housing and being adapted thereby for pivotal movement with respect to the semicylindrical internal surface of the housing, a first partition supported exteriorly of said casing for pivotal movement therewith and disposed for slidably sealing engagement with the semicylindrical internal surface of the housing during pivotal movement of said casing, a second partition supported between the housing and the casing and adapted for slidably sealing engagement with the cylindrical exterior of the casing during pivotal movement thereof, the housing being thus divided into two chambers by a barrier comprising said casing and said partitions, ports in said casing on opposite sides of said barrier communicating between said pump chamber and said housing chambers whereby positioning of said pump chamber eccentrically relative said pump rotor is operative to pump oil from one chamber to the other chamber displacing the first partition and the casing pivotally as the latter chamber expands and the former chamber contracts, for the purpose of obtaining a torque force externally of the housing by reason of the casing being keyed to the torque output shaft.

7. In a torque amplifying device, a liquid filled housing, a rotary pump therein comprising a casing having a cylindrically recessed pump chamber therein and a pump rotor supported for rotation in said pump chamber, a torque output shaft extending into said casing and having an outer end protruding therefrom for coupling to a torque operated device and an inner end slidably keyed to said casing whereby said casing is supported for pivotal displacement within said housing and for eccentric displacement relative said pump rotor, means for eccentrically displacing said casing relative said rotor for controlling pumping action thereof in quantity and direction, said casing comprising a barrier dividing said housing into two chambers communicating with said pump chamber through ports provided in said casing whereby said pump rotor is operative to effect liquid interchange between said chambers pivotally displacing said casing as one chamber expands and the other contracts, thereby transmitting a torque force to said torque output shaft in a direction depending on the direction of eccentric displacement of said pump chamber relative said pump rotor and at a rate dependent on the degree of eccentricity therebetween.

8. In a torque amplifying device as set forth in claim 7, wherein said means for displacing said casing eccentrically relative said pump rotor comprises a control shaft concentrically supported within said torque output shaft and having an outer end protruding beyond the exterior end of said torque output shaft, a cam at the inner end of said manual control shaft, and a cam slot within said casing in which said cam is disposed for shifting said casing linearly in one direction or the other, whereby the direction and rate of oil exchange between said chambers is controllable to determine the direction of torque and the torque power output of the device.

9. In a torque amplifier, a liquid filled housing, a rotary pump immersed therein comprising a rotor and a casing, barrier means comprising said casing dividing said housing into two chambers, means providing communication between said rotor and said chambers for reversible flow between said chambers, means for positioning said casing into concentric or eccentric relationship with said rotor for controlling the quantity and direction of liquid interchange between said chambers, said barrier means being displaced responsive to said liquid interchange to cause expansion of one chamber and contraction of the other whereby external force is derived from the displacement of said barrier means.

10. In a device as set forth in claim 9, a by-pass relief valve disposed at one limit of displacement of said barrier means operative to by-pass liquid flow from the outlet side to the inlet side of said rotor when said barrier means has reached said limit of displacement.

HARRY B. BREEDLOVE.

REFERENCES CITED

The following references are of record in the file of this patent:

UNITED STATES PATENTS

| Number | Name | Date |
|---|---|---|
| 1,497,741 | Schneider | June 17, 1924 |
| 1,611,895 | Dienner | Dec. 25, 1926 |
| 1,897,075 | Samson | Feb. 14, 1933 |
| 1,972,852 | Albright | Sept. 11, 1934 |
| 2,050,482 | Blood et al. | Aug. 11, 1936 |
| 2,067,136 | Bridenbaugh | Jan. 5, 1937 |